US007025076B2

United States Patent
Zimmerman, Jr. et al.

(10) Patent No.: US 7,025,076 B2
(45) Date of Patent: Apr. 11, 2006

(54) RAINWATER RECOVERY SYSTEM

(75) Inventors: Robert L. Zimmerman, Jr., Littleton, MA (US); Joseph Antocci, Leominster, MA (US); Nigel Pickering, Walpole, MA (US)

(73) Assignee: Charles River Watershed Association, Waltham, MA (US)

( * ) Notice: Subject to any disclaimer, the term of this patent is extended or adjusted under 35 U.S.C. 154(b) by 0 days.

(21) Appl. No.: 10/651,570

(22) Filed: Aug. 29, 2003

(65) Prior Publication Data

US 2004/0040598 A1 Mar. 4, 2004

Related U.S. Application Data

(60) Provisional application No. 60/407,162, filed on Aug. 30, 2002.

(51) Int. Cl.
*E04D 13/04* (2006.01)

(52) U.S. Cl. .................. 137/1; 137/357; 137/236.1; 137/565.01; 405/36; 405/53

(58) Field of Classification Search .......... 137/357, 137/236.1, 565.01, 1; 405/36, 53, 52; 220/567.1
See application file for complete search history.

(56) References Cited

U.S. PATENT DOCUMENTS

| | | | | |
|---|---|---|---|---|
| 3,750,886 A | * | 8/1973 | Salm ................... | 210/111 |
| 4,689,145 A | | 8/1987 | Mathews et al. ........... | 210/170 |
| 4,812,237 A | | 3/1989 | Cawley et al. ............ | 210/605 |
| 4,934,404 A | * | 6/1990 | DeStefano ............... | 137/357 |
| 5,004,536 A | | 4/1991 | Geisler ................. | 210/136 |
| 5,059,330 A | | 10/1991 | Burkhardt .............. | 210/744 |
| 5,234,286 A | * | 8/1993 | Wagner ................. | 405/53 |
| 5,249,885 A | * | 10/1993 | Florence ............... | 405/36 |
| 5,407,562 A | | 4/1995 | Baldino ................ | 210/86 |
| 5,516,232 A | | 5/1996 | Filipski ................ | 405/36 |
| 5,531,888 A | | 7/1996 | Geiger et al. ........... | 210/162 |
| 5,770,057 A | | 6/1998 | Filion .................. | 210/162 |
| 5,810,510 A | * | 9/1998 | Urriola ................ | 137/236.1 |
| 5,848,856 A | | 12/1998 | Bohnhoff .............. | 405/36 |

(Continued)

FOREIGN PATENT DOCUMENTS

| | | |
|---|---|---|
| DE | 3819330 | 12/1989 |
| DE | 3910848 | 10/1990 |

OTHER PUBLICATIONS

Selders, A. W., Agricultural Engineering, *SW—12*, U.S. Department of Agriculture and West Virginia University, Cooperative Extension Service, Oct. 17, 1971.
Winter et al., Ground Water and Surface Water: A Single Resource, *U.S. Geological Survey Circular 1139*, U.S. Government Printing Office, Denver, Colorado, 1998, 79 pp.
Brodkin, Jon, Wanted: Residents to recycle water, *Milford Daily News*, Tri–Valley, May 29, 2002.
Rainbarrels—Rain Water Catchment, Collection and Storage Systems (visited May 29, 2002), <http://www.composters.com/docs/rainbarrels.htm>.
Assembly Instructions for the Urban Rain Barrel (visited May 29, 2002), <http://composters.com/gr/urb_instructions_front.jpg (& back.jpg)>.

*Primary Examiner*—Kevin Lee
(74) *Attorney, Agent, or Firm*—Choate, Hall & Stewart LLP

(57) ABSTRACT

A system and method for restoring the natural water cycle by reducing stormwater runoff and addressing issues affecting groundwater supply. In one embodiment of the invention, the system comprises a roof washer component, cistern component, pump, and manufactured dry well. The system is designed to divert polluted rooftop runoff, capture clean rooftop runoff and store this clean water for irrigation purposes and nonpotable uses, while infiltrating excess water to recharge groundwater supplies thereby replicating the natural hydrologic cycle.

22 Claims, 3 Drawing Sheets

U.S. PATENT DOCUMENTS

| | | | |
|---|---|---|---|
| 6,077,423 A | 6/2000 | Roy et al. | 210/121 |
| 6,086,756 A | 7/2000 | Roy | 210/155 |
| 6,095,718 A | 8/2000 | Bohnhoff | 405/52 |
| 6,171,507 B1 | 1/2001 | Roy et al. | 210/739 |
| 6,190,545 B1 | 2/2001 | Williamson | 210/155 |
| 6,241,881 B1 | 6/2001 | Pezzaniti | 210/155 |
| 6,299,775 B1 * | 10/2001 | Elston | 210/605 |
| 6,319,408 B1 | 11/2001 | Zebuhr | 210/624 |
| 6,355,160 B1 | 3/2002 | Wiseman et al. | 210/90 |
| 6,379,541 B1 | 4/2002 | Nicholas | 210/155 |
| 2001/0047954 A1 | 12/2001 | Happel | 210/155 |
| 2002/0025226 A1 | 2/2002 | Maestro | 405/43 |
| 2002/0057944 A1 | 5/2002 | Adams et al. | 405/39 |

* cited by examiner

RAINWATER RECOVERY SYSTEM

CROSS-REFERENCE TO RELATED APPLICATIONS

The present application claims priority to U.S. Provisional Application No. 60/407,162, filed Aug. 30, 2002, the teachings of which are incorporated herein by reference.

FIELD OF THE INVENTION

The present invention relates to the field of water conservation and reclamation and more particularly to a system and method for reclaiming and recovering rain water.

BACKGROUND OF THE INVENTION

Many urbanized areas in the United States are running out of potable water and improvements in water quality are becoming increasingly difficult and expensive to attain. Most of these environmental problems are related to the proliferation of impervious (paved or constructed) surfaces. Imperviousness has a double-edged effect that disconnects rainfall from groundwater thus interrupting the hydrologic cycle and reducing groundwater recharge and baseflows in rivers and streams while augmenting flooding problems, instream erosion, stormwater runoff, and increasing frequency of Combined Sewer Overflow (CSO) discharges. For a general treatise on the hydrologic cycle, the interaction of ground water and surface water, and water management, see Winter et al., Ground Water and Surface Water: A Single Resource, U.S. Geological Survey Circular 1139, U.S. Government Printing Office, Denver, Colo., 1998, 79 pp., the teachings of which are incorporated herein by reference.

Imperviousness is generally associated with growth and growth is associated with greater water demand. The consequence is that there is less water stored while more water is demanded. Additionally, each summer demand for potable water doubles in many communities as residents seek to irrigate their lawns, while in urbanized areas a preferred method of treating wastewater is through large regional systems that move water out of basin or sub-basins. The result is that demand for potable water frequently exceeds supply and causes many communities to enforce water bans during the summer months.

There is therefore a need for a system to mitigate the effects of urbanization on water resources, including reduced aquifer recharge, greater human demand, the proliferation of regional wastewater treatment facilities, and lack of conservation.

SUMMARY OF THE INVENTION

The present invention provides a system and method for addressing issues affecting water resources. In one embodiment of the invention, the system comprises a roof washer component, cistern component, pump, and manufactured dry well. The system is designed to divert contaminated rooftop runoff, capture clean rooftop runoff and store this clean water for irrigation purposes and nonpotable uses, while infiltrating excess water to recharge groundwater supplies thereby replicating the natural hydrologic cycle.

BRIEF DESCRIPTION OF THE DRAWING

The invention is described with reference to the several figures of the drawing, in which.

DETAILED DESCRIPTION OF THE VARIOUS EMBODIMENTS OF THE INVENTION

Figure 1:
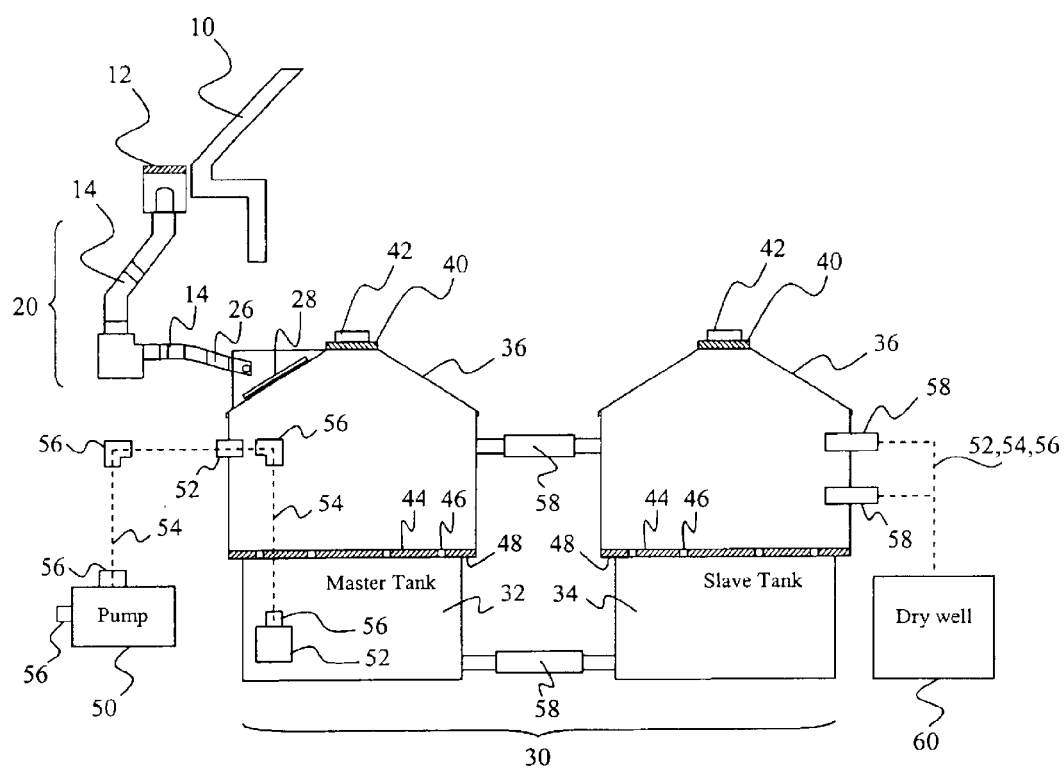
FIG. 1 is a schematic illustration of a rainwater recovery system according to one embodiment of the invention.

The present invention is designed to capture rooftop runoff in order to store some of the water for irrigation purposes and nonpotable uses like car washing, recharge any excess to a dry well for infiltration into groundwater supplies, and reduce stormwater runoff. The present invention will reduce demand on potable water supplies for irrigation, reduce polluted stormwater runoff, and enhance aquifer storage, particularly during the summer months, helping sustain public drinking water supplies and increases flow and groundwater recharge.

The present invention offers the following environmental benefits: increases ground water recharge; decreases runoff volume and peak flows to storm drains; decreases potential for flooding; improves stormwater quality; reduces potable water demand for irrigation during the stressed summer months; provides strategic emergency supply; potential to offset effect of local well withdrawals by recharging groundwater supply.

The present invention offers the following homeowner benefits: provides supply of nonpotable water for lawn care, car washing, plantings etc.; saves homeowners money by reducing the dependency on municipal water supplies; supplies a source of water during town watering bans and restrictions; locked lids for safety; knowledge that you are helping to restore our natural environment.

According to one embodiment of the present invention, each system will store or recharge up to 2400 gallons per day depending on soils, or the equivalent of 100 percent of the runoff from a 2000 square foot roof in a 2-inch rainstorm. A homeowner places at least two partially buried, 400-gallon plastic storage tanks near roof drains to collect water before it hits pavement and picks up oil and other contaminants. The water is then stored in the tanks for the homeowner's use sending all excess into a dry well for ground water recharge.

The system of the present invention includes the following components: one or two roof washers; two or more 400-gallon, 44×66 inches, plastic tanks (the tanks can be "daisy-chained" together to create additional storage depending on irrigation and other water needs); 600-gallon dry well for 2000 square foot roof; internal sump pump for irrigation; and pipes and connections.

The tanks are connected to roof gutters and downspouts and store rainwater runoff for nonpotable uses. All of the roof area can be linked to the tanks with aboveground or belowground piping. The tanks are located in one central area or distributed around the house. Gravity feed or a pump supplies water to a drip sprinkler irrigation system. The excess water is directed to the dry well and infiltrates into the ground to provide recharge to the groundwater. The small amount of overflow from the dry well is directed away from the house. The system is equipped to deal with many possible forms of contamination from the rooftop. The first level of protection will be in the form of a removable, cleanable screen to catch leaves and large solids. A flow diverter minimizes potential chemical contamination by diverting the first-flush runoff away from the system. The third level of protection is in the tanks themselves. They serve as a settling basin for any suspended solids that enter the tanks and have a removable lid to allow removal of solids. Finally, the dry well has a maintenance port for periodic cleanout.

The 400-gallon tanks are designed to be used either without any excavation, or placed in a two or three foot deep hole, easily dug by a homeowner, to lower their overall profile. They are designed to be linked together easily, increasing storage capacity to irrigate larger lawns or gardens. They can be remotely connected, for example, by placing a barrel at each corner of a home, still hooking all four tanks together using inexpensive PVC pipe, or located away from a home altogether, and yet still harvest and store roof rainwater through underground piping. The tanks are designed to handle overflows by linking them to dry wells. The dry well construction requires excavation of about 85 ft$^3$. The system is designed to recharge twice its volume in a day. In eastern Massachusetts, this design will recharge the volume of a 1 inch rainfall from a 2000-ft$^3$ rooftop.

Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

FIG. 1 is a schematic illustration of a rainwater recovery and reclamation system according to one embodiment of the invention. In a preferred embodiment, the system comprises a roof washer first flush system 20, cistern component 30, pump 50, and manufactured dry well 60. A building roof 10 serves as a catchment area to collect rainwater. For a description of the use of a building roof as a catchment area and the amount of water typically available, see A. W. Selders, SW-12, Agricultural Engineering, U.S Department of Agriculture and West Virginia University, Cooperative Extension Service, Oct. 17, 1971, the teachings of which are incorporated herein by reference. Water flows from the roof 10, through a roof gutter having a leaf gutter guard 12, and through gutter conduit and piping system 14 (including 1", 2" or 3" PVC pipe, 45° and 90° elbows) to the roof washer first flush system 20.

Figure 2:
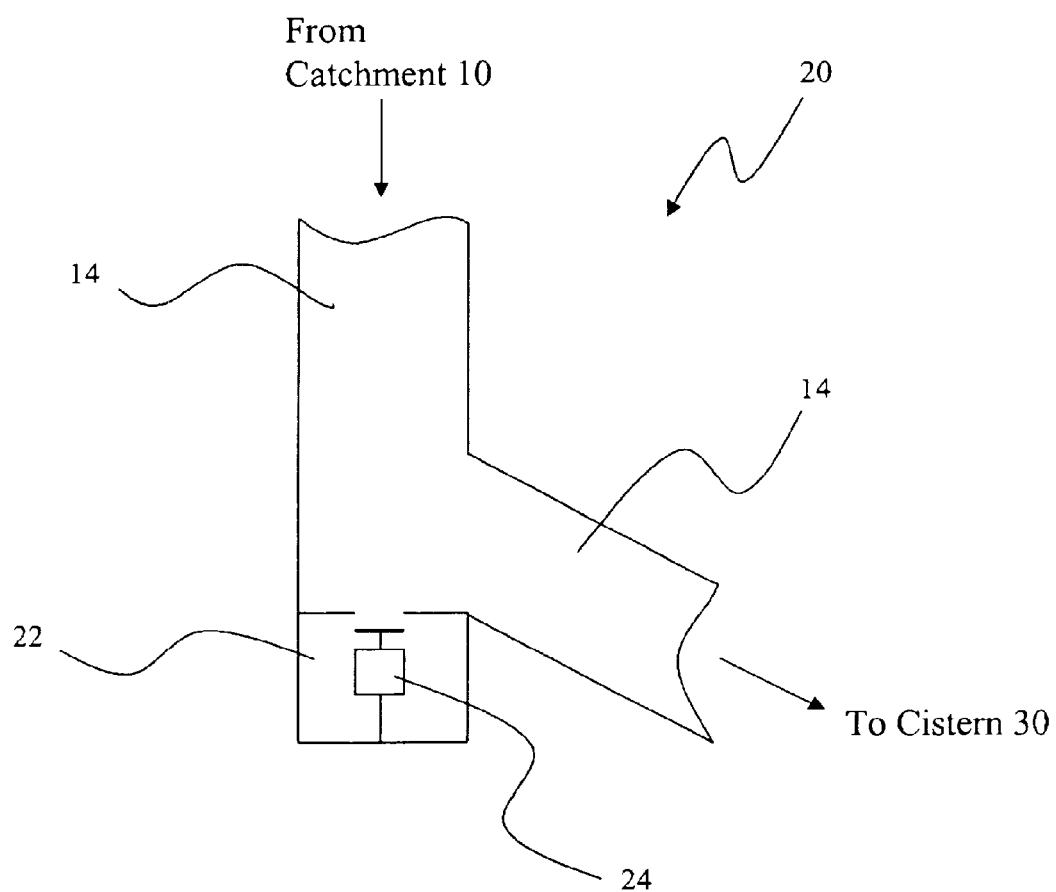
FIG. 2 is a schematic illustration of a first flush roof washer system according to one embodiment of the invention.

FIG. 2 is a schematic view of the first flush roof washer system 20. The roof washer 20 diverts the first "flush" of rainwater into a chamber/container 22, which closes by means an assembly 24, such as a valve assembly, after diverting and collecting about 1 mm of rainwater, allowing the remaining runoff water to enter the cistern component 30 through a universal downspout connection 26.

Introducing the rooftop runoff water to the cistern component 30 in this manner helps prevent the runoff water from traveling over impervious surfaces, picking up pollutants, such as oil and other contaminants, and discharging into storm drains and surface and ground waters. In another embodiment, the runoff water may potentially be run through a system to remove pollutants before introduction to the cistern component 30. Examples of systems for removing pollutants from stormwater are described in U.S. Pat. No. 6,241,881 to Pezzaniti and U.S. Pat. No. 6,086,756 to Roy, the teachings of which are incorporated herein by reference.

Figure 3:
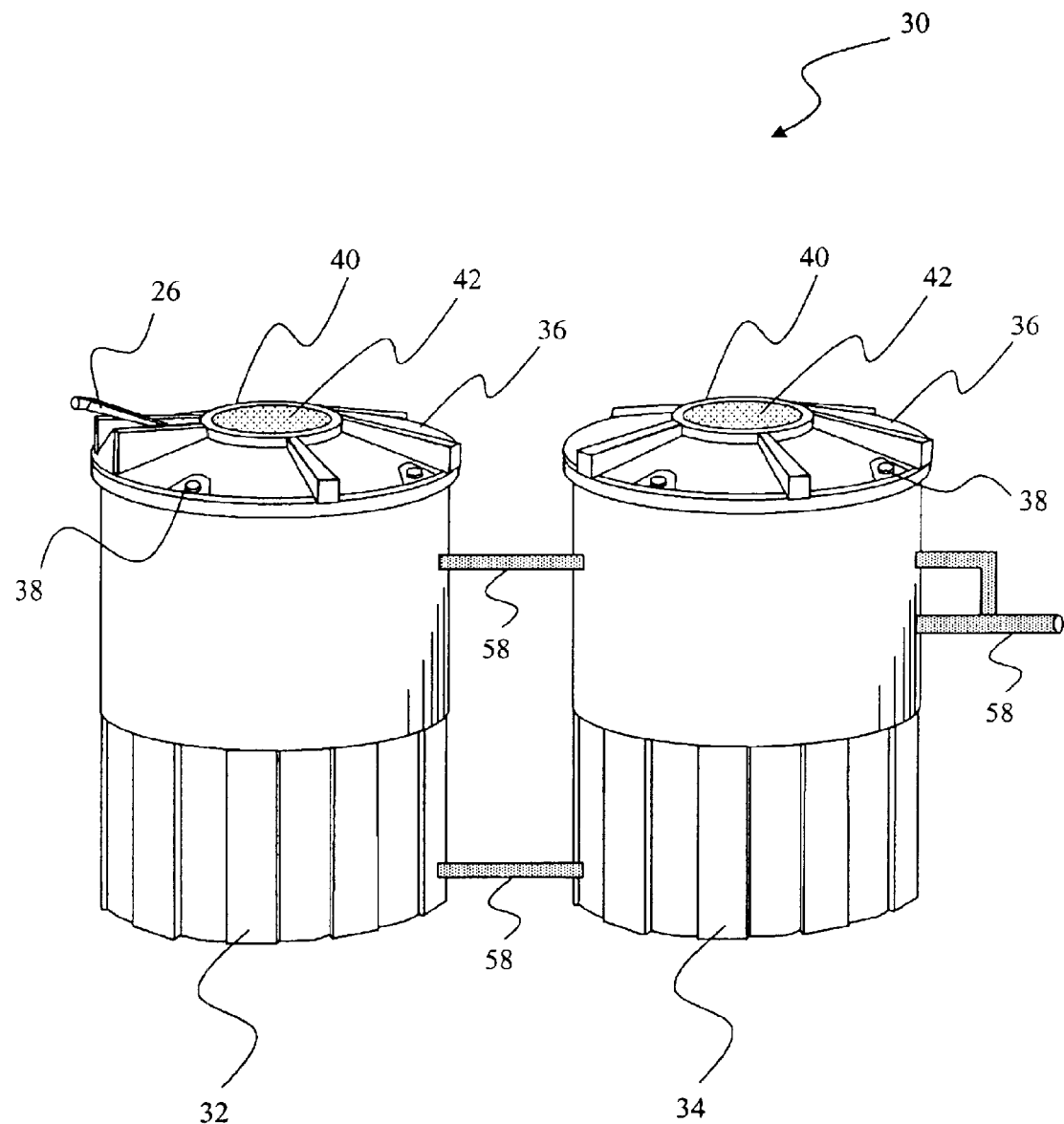
FIG. 3 is a perspective view of a cistern component comprising master and slave tanks according to one embodiment of the invention.

The cistern comprises two types of tanks: master 32 and slave 34. FIG. 3 is a perspective view of the cistern component 30 comprising master 32 and slave 34 tanks according to one embodiment of the invention. In a preferred embodiment, each tank of about 400 gallons and having dimensions of approximately 44×66 inches is rotationally molded and made of ultraviolet light-resistant plastic. The tanks are designed to allow for stacking during shipping and for retail storage. While the tanks can be installed above ground, they are primarily designed to be partially buried in the ground, with about 30 inches of the tank protruding above the ground surface. As shown in FIG. 3, the buried portion of the tank may have ridged side walls to help secure the tank in the ground. The tanks can be located in one central area or distributed around the perimeter of a building and linked by above or below-ground piping. The tanks have an expected lifespan of 10–20 years in direct sunlight and are each fitted with a tank cover 36. Each cover 36 will generally have four attachment mechanisms 38. In a preferred embodiment, the mechanisms comprise S.S. hex bolts (¼-20, 3" long), ¼ S.S. flat washers, and a flange bushing. Tamper resistant screws can also be used.

The tank interface with the conduit and piping system has three degrees of freedom which greatly facilitates the connection of the conduit and piping system to the master tank.

One, the tank cover is a separate piece which incorporates a feature for locating a rotationally molded gutter conduit and downspout connector and a water entry opening. The cover can be rotated a full 360 degrees which allows the gutter conduit and connector and water entry opening to be located precisely after the lower tank sections are installed.

Two, one end of the molded gutter conduit and connector pivots on the aforementioned tank cover feature above the water entry opening. The gutter conduit and connector pivots approximately thirty degrees for connection flexibility.

Three, the one piece roto-molded gutter conduit is also designed as three integrated but distinct sections. The gutter conduit can be cut at installation to fit a 3 inch diameter PVC pipe or two sizes of standard rectangular gutter downspout piping. It can also be used as an extender element to facilitate installation.

A filter assembly 28, for example a geotextile fabric, positioned above the master tank cover where the universal downspout connector 26 links to the master tank 32 on the sloping top helps prevent mosquitoes, leaves, twigs and other contaminants from entering the master tank. The master tank 32 and the slave tank 34 have an observation port 40 with a threaded cap 42 to allow viewing and access inside the tank. In one embodiment, the observation port 40 measures approximately 4" in diameter. In another embodiment, the threaded cap 42 may be transparent to allow easy viewing inside the tank without removal. A circular plate 44, which has the same circumference as the tank, rests inside the interior of the tank on an indented lip 48 about 30" from the top of the tank. This circular plate 44 has holes 46 for drainage and serves as a secondary safety device. The plate can be lifted out for tank maintenance. In one embodiment, the plate 44 is made of ABS plastic.

The pumping system, which in one embodiment is external to the master 32 or slave tank 34, comprises the pump 50, adaptor valves and fittings 52, pipes and hoses 54, and hose connections and couplings 56. In one embodiment, two hose connections 58, one at the top and one at the bottom of the tank, link the slave tank 34 and master tank 32 together. Hose connections can be made with 2" diameter, 12" long hose and hose nipples, clamps and bulkhead fittings. The slave tank may have additional hose connections 58 to provide for the connection of additional tanks and removal of overflow. The pumping system fittings, pipes, hoses and connections may also include multiple ball valves, elbows, and coupling devices depending on the system design and placement. Eight to ten tanks can be connected to expand system capacity. After that, the system is unlikely to be economical. The tanks can be remotely connected, for example, by placing a barrel at each corner of a home, still hooking the tanks together using inexpensive PVC piping, or located away from a home altogether, and yet still harvest and store roof rainwater runoff through underground piping.

Water from the cistern 30 may be pumped out using the pump 50 for use in irrigation and non-potable uses, such as car washing. In one embodiment, the pump is a sump pump to provide water for irrigation. In another embodiment, depending on the design layout of the system, it is possible for gravity feed to supplement the pump 50 when supplying water for irrigation. Excess water overflows to the dry well 60, from the slave tank 34, for infiltration into groundwater supplies and aquifer recharge. In a preferred embodiment, the dry well construction requires excavation of about 85 cubic feet for a 600 gallon dry well and 2000 square foot roof. The system is designed to recharge twice its volume in a day. Examples of dry well systems are described in U.S. Pat. Nos. 6,095,718 and 5,848,856 both to Bohnhoff and U.S. Pat. No. 4,689,145 to Mathews et al., the teachings of which are incorporated herein by reference.

The water used from this system will help relieve demand on municipal water systems, particularly during the summer months. The water infiltrated by the dry well 60 will promote recharge of groundwater supplies. The system provides storage that reduces stormwater runoff. Each system will store or recharge up to 2400 gallons per day depending on soils, or the equivalent of 100 percent of the runoff from a 2000 square foot roof in a 2-inch rainstorm.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for rainwater reclamation, comprising:
   at least one roof washer;
   at least one cistern connected to said roof washer;
   at least one pump adapted to pump water collected in said at least one cistern; and
   at least one dry well system connected to said at least one cistern, wherein said at least one roof washer includes a flow diverter that diverts a first flush of water away from said at least one cistern and permits water in excess of said first flush of water to flow to said at least one cistern.

2. The system of claim 1, wherein said at least one cistern includes a piping system that stores water.

3. The system of claim 1, wherein said at least one cistern includes at least one water storage component that is buried at least partially underground.

4. The system of claim 1, wherein said at least one cistern includes a master tank and at least one slave tank connected to said master tank.

5. The system of claim 1, further comprising:
   a gutter guard disposed upstream from said at least one roof washer that helps prevent pollutants from contaminating said system.

6. The system of claim 1, wherein said flow diverter includes at least one valve assembly that diverts said first flush of water as a specified volume of water, and wherein after said specified volume of water has flowed through said at least one valve assembly, said at least one valve assembly closes to prevent further water from diverting away from said at least one cistern.

7. A method for rainwater reclamation, comprising:
   forming a water flow from a catchment area;
   diverting a first flush of said water flow and allowing excess water flow to continue flowing;
   collecting said excess water flow in at least one cistern;
   pumping collected water from said at least one cistern for a desired use; and
   diverting excess collected water from said at least one cistern to a dry well system for recharging groundwater supplies.

8. The method of claim 7, wherein said at least one cistern includes a piping system that stores water.

9. The method of claim 7, wherein said at least one cistern includes at least one water storage component that is buried at least partially underground.

10. The method of claim 7, wherein said at least one cistern includes a master tank and at least one slave tank connected to said master tank.

11. The method of claim 7, further comprising:
    disposing a gutter guard upstream from said at least one roof washer that helps prevent pollutants from contaminating said system.

12. The method of claim 7, wherein said flow diverter includes at least one valve assembly that diverts said first flush of water as a specified volume of water, and wherein after said specified volume of water has flowed through said at least one valve assembly, said at least one valve assembly closes to prevent further water from diverting away from said at least one cistern.

13. A system for rainwater reclamation, comprising:
    at least one washer system disposed adjacent to a catchment area; and
    at least one cistern connected to said at least one washer system, wherein said at least one washer system includes a flow diverter that diverts a first flush of fluid away from said at least one cistern and permits fluid in excess of said first flush of fluid to flow to said at least one cistern, wherein said at least one cistern includes a master tank and at least one slave tank connected to said master tank.

14. The system of claim 13, wherein said at least one cistern includes a piping system that stores fluid.

15. The system of claim 13, wherein said at least one cistern includes at least one fluid storage component that is buried at least partially underground.

16. The system of claim 13, further comprising:
    a gutter guard disposed upstream from said at least one washer system that helps prevent pollutants from entering said at least one washer system.

17. The system of claim 13, wherein said flow diverter includes at least one valve assembly that diverts said first flush of fluid as a specified volume of fluid, and wherein after said specified volume of fluid has flowed through said at least one valve assembly, said at least one valve assembly closes to prevent further fluid from diverting away from said at least one cistern.

18. A system for rainwater reclamation comprising:
    at least one washer system disposed adjacent to a catchment area; and
    at least one cistern connected to said at least one washer system, wherein said at least one washer system includes a flow diverts a first flush of fluid away from said at least one cistern and permits fluid in excess of said first of fluid to flow to said at least one cistern; and
    at least one dry well system connected to said at least one cistern for recharging groundwater supplies.

19. The system of claim 20, wherein said at least one cistern includes a piping system that stores fluid.

20. The system of claim 20, wherein said at least one cistern includes at least one fluid storage compound that is buried at least partially underground.

21. The system of claim 20, further comprising:
    a gutter guard disposed upstream from said at least one washer system that helps prevent pollutants from entering said at least one washer system.

22. The system of claim 20, wherein said flow diverter includes at least one valve assembly that diverts said first flush of fluid as a specified volume of fluid, and wherein after said specified volume of fluid has flowed through said at least one valve assembly, said at least one valve assembly closes to prevent further fluid from diverting away from said at least one cistern.

* * * * *